United States Patent
Bi

(10) Patent No.: US 9,952,763 B1
(45) Date of Patent: Apr. 24, 2018

(54) ALTERNATIVE GESTURE MAPPING FOR A GRAPHICAL KEYBOARD

(71) Applicant: Google Inc., Mountain View, CA (US)

(72) Inventor: Xiaojun Bi, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 521 days.

(21) Appl. No.: 14/623,281

(22) Filed: Feb. 16, 2015

Related U.S. Application Data

(60) Provisional application No. 62/041,868, filed on Aug. 26, 2014.

(51) Int. Cl.
G06F 3/0488 (2013.01)
G06F 3/0489 (2013.01)

(52) U.S. Cl.
CPC ........ *G06F 3/04886* (2013.01); *G06F 3/0489* (2013.01); *G06F 3/04883* (2013.01); *G06F 3/04895* (2013.01)

(58) Field of Classification Search
CPC .............. G06F 3/04886; G06F 3/0489; G06F 3/04895; G06F 3/04883
See application file for complete search history.

(56) References Cited

U.S. PATENT DOCUMENTS

| | | | |
|---|---|---|---|
| 5,283,559 A | 2/1994 | Kalendra et al. | |
| 5,828,575 A * | 10/1998 | Sakai | G05B 19/4097 700/182 |
| 6,252,579 B1 * | 6/2001 | Rosenberg | G06F 3/016 345/157 |
| 8,701,050 B1 | 4/2014 | Starner et al. | |
| 9,757,646 B2 * | 9/2017 | Dumitrescu | A63F 13/2145 |
| 2007/0040813 A1 * | 2/2007 | Kushler | G06F 3/0237 345/173 |
| 2009/0100383 A1 | 4/2009 | Sunday et al. | |
| 2009/0217211 A1 * | 8/2009 | Hildreth | G06F 3/017 715/863 |
| 2010/0171754 A1 * | 7/2010 | Hatfield | G06F 17/242 345/619 |
| 2012/0206380 A1 | 8/2012 | Zhao et al. | |
| 2012/0268411 A1 | 10/2012 | Chen et al. | |
| 2013/0187882 A1 | 7/2013 | Kim | |
| 2013/0249818 A1 * | 9/2013 | Zhai | G06F 3/04883 345/173 |
| 2014/0082545 A1 * | 3/2014 | Zhai | G06F 3/04886 715/773 |
| 2014/0109018 A1 | 4/2014 | Casey et al. | |
| 2014/0365878 A1 * | 12/2014 | Dai | G06F 3/04883 715/256 |
| 2015/0067462 A1 * | 3/2015 | George | G06F 17/242 715/211 |
| 2015/0277757 A1 * | 10/2015 | Ouyang | G06F 3/04897 715/773 |

* cited by examiner

*Primary Examiner* — Andrew T Chiusano
(74) *Attorney, Agent, or Firm* — Shumaker & Sieffert, P.A.

(57) ABSTRACT

A computing device is described that outputs a graphical keyboard comprising a plurality of keys. Responsive to receiving an indication of a gesture that traverses a first group of keys of the plurality of keys, the computing device determines a second group of keys of the plurality of keys. At least one key of the second group of keys is different from at least one key of the first group of keys. The computing device outputs, for display, a virtual path traversing a respective location of each respective key of the second group of keys.

16 Claims, 5 Drawing Sheets

ALTERNATIVE GESTURE MAPPING FOR A GRAPHICAL KEYBOARD

This application claims the benefit of U.S. Provisional Application No. 62/041,868 filed Aug. 26, 2014, the entire content of which is hereby incorporated by reference.

BACKGROUND

Some computing devices (e.g., mobile phones, tablet computers, etc.) may provide, as part of a graphical user interface, a graphical keyboard for inputting text using a presence-sensitive input device. A gesture keyboard is one example of a graphical keyboard that can enable a computing device to determine a string of text based on a continuous gesture input. The continuous gesture input may be comprised of a single, continuous gesture spanning locations of multiple keys of the gesture keyboard rather than multiple, individual tap-gesture inputs entered at each of the individual locations of the multiple keys. A gesture keyboard may be preferable to users who prefer to swipe across—rather than merely tap on—individual keys of a graphical keyboard.

Some gesture keyboards may have certain drawbacks, however. For instance, in order to select keys that are located far apart from one another (e.g., at opposite sides of the gesture keyboard), a continuous gesture may need to span the entire length or width of the gesture keyboard. Some users may have difficulty inputting such a gesture, particularly if the gesture keyboard is of a relatively large size.

SUMMARY

In one example, the disclosure is directed to a method that includes outputting, by a computing device and for display, a graphical keyboard comprising a plurality of keys, and responsive to receiving an indication of a gesture that traverses a first group of keys of the plurality of keys, determining, by the computing device, a second group of keys of the plurality of keys, wherein at least one key of the second group of keys is different from at least one key of the first group of keys. The method further includes outputting, by the computing device and for display, a virtual path traversing a respective location of each respective key of the second group of keys.

In another example, the disclosure is directed to a computing device that includes at least one processor and at least one module operable by the at least one processor to output, for display, a graphical keyboard comprising a plurality of keys, and responsive to receiving an indication of a gesture that traverses a first group of keys of the plurality of keys, determine a second group of keys of the plurality of keys, wherein at least one key of the second group of keys is different from at least one key of the first group of keys. The at least one module is further operable by the at least one processor to output, for display, a virtual path traversing a respective location of each respective key of the second group of keys.

In another example, the disclosure is directed to a computer-readable storage medium encoded with instructions that, when executed, cause at least one processor of a computing device to output, for display, a graphical keyboard comprising a plurality of keys, and responsive to receiving an indication of a gesture that traverses a first group of keys of the plurality of keys, determine a second group of keys of the plurality of keys, wherein at least one key of the second group of keys is different from at least one key of the first group of keys. The computer-readable storage medium is encoded with additional instructions that, when executed, cause the at least one processor to output, for display, a virtual path traversing a respective location of each respective key of the second group of keys.

The details of one or more examples are set forth in the accompanying drawings and the description below. Other features, objects, and advantages of the disclosure will be apparent from the description and drawings, and from the claims.

DETAILED DESCRIPTION

Figure 1:
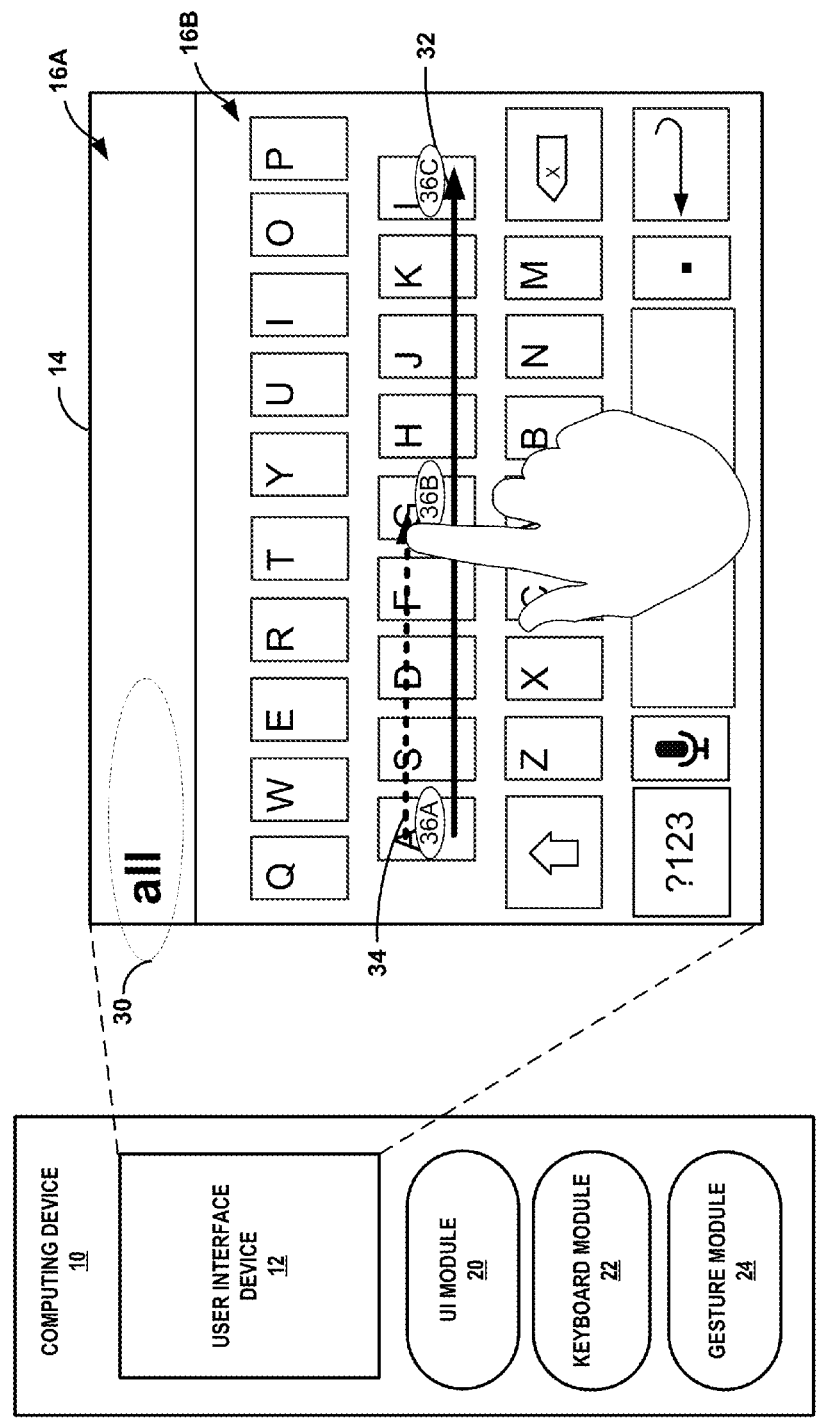
FIG. 1 is a conceptual diagram illustrating an example computing device that is configured to present a virtual path traversing a group of keys of a gesture keyboard, in accordance with one or more aspects of the present disclosure.

In general, this disclosure is directed to techniques for determining a virtual path across one or more keys of a gesture keyboard that are not traversed by a continuous gesture and determining inputted text based on the virtual path rather than on a group of keys actually traversed by the continuous gesture. As an example, a computing device that implements techniques of this disclosure may initially present a gesture keyboard at a display. The computing device may detect a gesture at one or more locations of a presence-sensitive device that correspond to one or more locations of the keys of the gesture keyboard that are output at the display. Based on the detected gesture, the computing device may determine a selection of a first group of keys of the gesture keyboard.

Rather than directly mapping the original locations of the gesture to the locations of the first group of keys in order to determine the first group of keys, the computing device may alternatively or additionally use one or more alternative mapping techniques to determine which keys the user inputting the gesture intends to select. In other words, to determine the selection of the one or more keys based on the gesture, the computing device may not map the original locations of the gesture directly (e.g., using a one-to-one mapping ratio) to the locations of the closest keys (i.e., the first group of keys). Instead, the computing device may use an alternative mapping ratio (e.g., a one-to-'n', where n is greater than one) combined with the original locations of the gesture, to determine an alternative set of locations. In the example, the computing device may thereby determine a second group of keys based on the alternative set of locations.

In some implementations, the computing device may output, for display, a virtual path or trace as a way to provide graphical feedback of the alternative set of locations as the computing device has defined them. Said differently, the computing device may present a virtual path at locations of the presence-sensitive screen, wherein the virtual path graphically depicts where on the gesture keyboard the gesture would have been detected had the user provided the gesture at the alternative set of locations of the presence-sensitive screen.

Therefore, according to the techniques described herein, the computing device may define an alternative set of locations based on a given gesture. Such techniques, when employed by a computing device, may also enable the computing device to determine a selection of keys from a gesture that is smaller in size than a gesture typically required by computing devices (i.e., those not employing these techniques) to select the same group of keys. In addition, by presenting a virtual path based on the alternative set of locations, the computing device can provide visual feedback of the selection in real-time. Thus, by enabling the computing device to determine a selection of keys based on a smaller-sized gesture, the techniques may provide a way for a user to enter text more quickly, with less effort, and/or with less discomfort. As such, the techniques may enable a computing device to receive input for determining text (e.g., a character string) in a shorter amount of time.

FIG. 1 is a conceptual diagram illustrating an example computing device that is configured to present a virtual path traversing a group of keys of a gesture keyboard, in accordance with one or more aspects of the present disclosure. In the example of FIG. 1, computing device 10 may be a mobile phone. However, in other examples, computing device 10 may be a tablet computer, a personal digital assistant (PDA), a laptop computer, a portable gaming device, a portable media player, an e-book reader, a watch, television platform, or another type of computing device.

As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as an input device using a presence-sensitive input device, such as a resistive touchscreen, a surface acoustic wave touchscreen, a capacitive touchscreen, a projective capacitance touchscreen, a pressure sensitive screen, an acoustic pulse recognition touchscreen, or another presence-sensitive input device technology. UID 12 may function as an output device using any one or more of a liquid crystal display (LCD), dot matrix display, light emitting diode (LED) display, organic light-emitting diode (OLED) display, e-ink, or similar monochrome or color display capable of outputting visible information to the user of computing device 10.

UID 12 of computing device 10 may include a presence-sensitive screen (e.g., presence-sensitive display) that may receive tactile user input from a user of computing device 10. UID 12 may receive indications of the tactile user input by detecting one or more tap and/or non-tap gestures from a user of computing device 10 (e.g., the user touching or pointing to one or more locations of UID 12 with a finger or a stylus pen). The presence-sensitive screen of UID 12 may present output to a user. UID 12 may present the output as a user interface (e.g., user interface 14) which may be related to functionality provided by computing device 10. For example, UID 12 may present various user interfaces of applications (e.g., an electronic message application, an Internet browser application, etc.) executing at computing device 10. A user of computing device 10 may interact with one or more of these applications to perform a function with computing device 10 through the respective user interface of each application.

Computing device 10 may include user interface ("UI") module 20, keyboard module 22, and gesture module 24. Modules 20, 22, and 24 may perform operations described using software, hardware, firmware, or a mixture of both hardware, software, and firmware residing in and executing on computing device 10. Computing device 10 may execute modules 20, 22, and 24, with multiple processors. Computing device 10 may execute modules 20, 22, and 24 as a virtual machine executing on underlying hardware.

Gesture module 24 of computing device 10 may receive from UID 12, one or more indications of user input detected at UID 12. Generally, each time UID 12 receives an indication of user input detected at a location of UID 12, gesture module 24 may receive information about the user input from UID 12.

For example, UID 12 may virtually overlay a grid of coordinates onto UID 12. The grid may not be visibly displayed by UID 12. The grid may assign a coordinate that includes a horizontal component (X) and a vertical component (Y) to each location. Each time UID 12 detects a gesture input, gesture module 24 may receive information from UID 12. The information may include one or more coordinate locations and associated times indicating to gesture module 24 both, where UID 12 detects the gesture input at UID 12, and when UID 12 detects the gesture input.

Gesture module 24 may assemble the information received from UID 12 into a time-ordered sequence of touch events. For example, each touch event in the sequence may include data or components that represents parameters for characterizing a presence and/or movement (e.g., when, where, originating direction) of input at UID 12. Each touch event in the sequence may include a location component (e.g., a x,y coordinate of a location at UID 12), a time component related to when UID 12 detected user input at the location, and an action component related to whether the touch event corresponds to a lift up or a push down at the location.

Gesture module 24 may determine one or more characteristics of the user input based on the sequence of touch events and include information about these one or more characteristics within each touch event in the sequence of touch events. For example, gesture module 24 may determine a start location of the user input, an end location of the user input, a density of a portion of the user input, a speed of a portion of the user input, a direction of a portion of the user input, and a curvature of a portion of the user input. One or more touch events in the sequence of touch events may include (in addition to a time, a location, and an action component as described above) a characteristic component that includes information about one or more characteristics of the user input (e.g., a density, a speed, etc.). Gesture module 24 may transmit, as output to UI module 20, the sequence of touch events including the components or parameterized data associated with each touch event.

UI module 20 may cause UID 12 to present user interface 14. User interface 14 includes graphical elements displayed at various locations of UID 12. FIG. 1 illustrates edit region 16A and gesture keyboard 16B of user interface 14. Gesture keyboard 16B includes selectable, graphical elements displayed as keys for typing text at edit region 16A. Edit region 16A may include graphical elements such as images, objects, hyperlinks, characters of text (e.g., character strings) etc., that computing device 10 generates in response to input detected at gesture keyboard 16B. In some examples, edit region 16A is associated with a messaging application, a word processing application, an internet webpage browser application, or other text entry field of an application, operating system, or platform executing at computing device 10. In other words, edit region 16A represents a final destination of the letters that a user of computing device 10 is selecting using gesture keyboard 16B and is not an intermediary region associated with gesture keyboard 16B, such as word suggestion or autocorrect region that displays one or more complete word suggestions or autocorrections.

FIG. 1 shows the letters a-l-l within edit region 16A. The letters a-l-l make up a string of characters or candidate word 30. Candidate word 30 is delineated by dashed circles in the example of FIG. 1, however UI device 12 may or may not output such dashed circles in some examples. Candidate word 30 may be a portion of a word and/or a word or portion of a word included in a dictionary.

FIG. 1 also shows virtual path 32 and actual path 34 presented as line segments spanning locations of keys of gesture keyboard 16B. UI module 20 may cause UID 12 to present actual path 34 based on information received from gesture module 24 about the original locations of a gesture detected by UID 12. In other words, UI module 20 may cause UID 12 to display actual path 34 at UID 12 such that, when actual path 34 is presented at UID 12, actual path 34 is visible to a user. In some examples, UI module 20 may refrain from causing UID 12 to present actual path 34 based on the location information received from gesture module 24. In other words, UI module 20 may cause UID 12 to not display or show actual path 34 so that actual path 34 is not visible to a user. UI module 20 may cause UID 12 to present virtual path 32 based on location information received from keyboard module 22 about the re-defined locations of a gesture detected by UID 12. In other words, UI module 20 may cause UID 12 to display virtual path 32 at UID 12 such that, when virtual path 32 is presented at UID 12, virtual path 32 is visible to a user. UI module 20 may cause UID 12 to present virtual path 32 at a region of UID 12 at which gesture keyboard 16B is displayed. In some examples, UI module 20 may refrain from causing UID 12 to present virtual path 32 based on the location information received from keyboard module 22. In other words, UI module 20 may cause UID 12 to not display or show virtual path 32 so that virtual path 32 is not visible to a user. The details regarding how UI module 20 causes UID 12 to present actual path 34 and virtual path 32 are described in detail below.

A user of computing device 10 may enter text in edit region 16A by providing input (e.g., tap and/or non-tap gestures) at locations of UID 12 that display the keys of gesture keyboard 16B. In response to user input such as this, computing device 10 may output one or more characters, strings, or multi-string phrases within edit region 16A, such as candidate word 30. In some examples, a word may generally be described as a string of one or more characters in a dictionary or lexicon (e.g., a set of strings with semantic meaning in a written or spoken language), a "word" may, in some examples, refer to any group of one or more characters." For example, a word may be an out-of-vocabulary word or a string of characters not contained within a dictionary or lexicon but otherwise used in a written vocabulary to convey information from one person to another. For instance, a word may include a name, a place, slang, or any other out-of-vocabulary word or uniquely formatted strings, etc., that includes a first portion of one or more characters followed by a second portion of one or more characters.

UI module 20 may act as an intermediary between various components of computing device 10 to make determinations based on input detected by UID 12 and generate output presented by UID 12. For instance, UI module 20 may receive, as an input from keyboard module 22, a representation of a keyboard layout of the keys included in gesture keyboard 16B. UI module 20 may receive, as an input from gesture module 24, a sequence of touch events generated from information about user input detected by UID 12.

In some examples, UI module 20 may, without altering or defining a set of alternative locations based on the original locations of the touch events, determine that the one or more location components in the sequence of touch events approximate a selection of one or more keys (e.g., UI module 20 may determine the location of one or more of the touch events corresponds to an area of UID 12 that presents gesture keyboard 16B). UI module 20 may transmit, as output to keyboard module 22, the sequence of touch events received from gesture module 24, along with locations where UID 12 presents each of the keys.

In response to transmitting touch events and locations of keys to keyboard module 22, UI module 20 may receive a candidate word (e.g., a string of text representing candidate word 30) that keyboard module 22 determined from the sequence of touch events. UI module 20 may update user interface 14 to include candidate word 30 received from keyboard module 22 within edit region 16A. UI module 20 may cause UID 12 to present the updated user interface 14 including candidate word 30 presented as graphical elements (e.g., characters) in edit region 16.

Keyboard module 22 of computing device 10 may transmit, as output to UI module 20 (for inclusion as gesture keyboard 16B of user interface 14) a keyboard layout including a plurality of keys related to one or more written languages (e.g., English, Spanish, French, etc.). Keyboard module 22 may assign one or more characters or operations to each key of the plurality of keys in the keyboard layout. For instance, keyboard module 22 may generate a QWERTY keyboard layout including keys that represent characters used in typing the English language. The QWERTY keyboard layout may also include keys that represent operations used in typing the English language (e.g., backspace, delete, spacebar, enter, etc.).

Keyboard module 22 may receive data from UI module 20 that represents the sequence of touch events generated by gesture module 24 as well as the locations of UID 12 where UID 12 presents each of the keys of gesture keyboard 16B. Keyboard module 22 may determine, based on the locations of the keys and that the sequence of touch events, a selection of one or more keys. Keyboard module 22 may determine a character string based on the selection where each character in the character string corresponds to at least one key in the selection. Keyboard module 22 may send data indicating the character string to UI module 20 for inclusion as candidate word 30 in edit region 16A of user interface 14.

Keyboard module 22 may rely on various models and algorithms (e.g., a spatial model, a language model, etc.) to determine whether or not a sequence of touch events represents a selection of one or more keys. For example, keyboard module 22 may include spatial and language models to determine with a certain degree of certainty, which keys of gesture keyboard 16B are being selected and which character string is being entered with the selection.

A typical spatial model may include a distribution of touch locations that are used to generate one or more probabilities that a particular key of a gesture keyboard has been selected based on location data associated with a user input. In some examples, a spatial model includes a bivariate Gaussian model for a particular key. The bivariate Gaussian model for a key may include a distribution of coordinates (e.g., (x, y) coordinate pairs) that correspond to locations of UID 12 that present the given key. More specifically, in some examples, a bivariate Gaussian model for a key may include a distribution of coordinates that correspond to locations of UID 12 that are most frequently selected by a user when the user intends to select the given key. A shorter distance between location data of a user input and a higher density area of the spatial model, the higher the probability that the key associated with the spatial model has been selected. A greater distance between location data of a user input and a higher density area of the spatial model, the lower the probability that the key associated with the spatial model has been selected.

Using such a spatial model, keyboard module 22 may compare the location components (e.g., coordinates) of one or more touch events in the sequence of touch events to respective locations of one or more keys of gesture keyboard 16B and generate a probability based on these comparisons that a selection of a key occurred. For example, keyboard module 22 may compare the location component of each touch event in the sequence of touch events to a key location of a particular key of gesture keyboard 16B. The location component of each touch event in the sequence may include one location of UID 12 and a key location (e.g., a centroid of a key) of a key in gesture keyboard 16B may include a different location of UID 12. Keyboard module 22 may determine a Euclidian distance between the two locations and generate a probability based on the Euclidian distance that the key was selected. Keyboard module 22 may correlate a higher probability to a key that shares a smaller Euclidian distance with one or more touch events than a key that shares a greater Euclidian distance with one or more touch events. Based on the spatial model probability associated with each key, keyboard module 22 may assemble the individual key selections with the highest spatial model probabilities into a time-ordered sequence of keys that keyboard module 22 may then determine represents a character string.

Keyboard module 22 may rely on a language model and/or access a lexicon of computing device 10 to autocorrect (e.g., spellcheck) a character string generated from a sequence of key selections before and/or after outputting the character string to UI module 20 for inclusion within edit region 16A of user interface 14. A lexicon of computing device 10 may include a list of words within a written language vocabulary. Using a language model, keyboard module 22 may perform a lookup in the lexicon of a character string generated from a selection of keys to identify one or more candidate words that include at least some or all of the characters of the character string generated based on the selection of keys.

In some examples, keyboard module 22 may assign a Jaccard similarity coefficient to the one or more candidate words to determine a degree of similarity between a character string inputted by a user and a word in the lexicon. In general, a Jaccard similarity coefficient, also known as a Jaccard index, represents a measurement of similarity between two sample sets (e.g., a character string and a word in a dictionary). Based on the comparison, keyboard module 22 may generate a Jaccard similarity coefficient for one or more words in the lexicon. Each candidate word may include, as a prefix, an alternative arrangement of some or all of the characters in the character string. In other words, each candidate word may include as the first letters of the word, the letters of the character string determined from the selection of keys. For example, based on a selection of a-l, keyboard module 22 may determine that a candidate word of the lexicon with a greatest Jaccard similarity coefficient to a-l is all. Keyboard module 22 may output the autocorrected character string all to UI module 20 for inclusion in edit region 16A rather than the actual character string a-l indicated by the selection of keys.

In some examples, each candidate word in the lexicon may include a candidate word probability that indicates a frequency of use in a language and/or a likelihood that a user input at UID 12 (e.g., a selection of keys) actually represents an input to select the characters or letters associated with that particular candidate word. In other words, the one or more candidate words may each have a frequency of use probability that indicates how often each word is used in a particular written and/or spoken human language. Keyboard module 22 may distinguish two or more candidate words that each have high Jaccard similarity coefficients based on the frequency of use probability. Said differently, if two or more candidate words both have a high Jaccard similarity coefficient indicating that each could equally be the correct spelling of a character string, keyboard module 22 may select the candidate word with the highest frequency of use probability as being the most likely candidate word based on the selection of keys.

To determine which keys have been selected by an input detected at gesture keyboard 16B, and to potentially speed up word input using gesture keyboard 16B, keyboard module 22 may define an alternative set of locations, based on the location components of the time-ordered sequence of touch events generated by gesture module 24, using alternative mapping techniques. Keyboard module 22 may adjust one or more of the location components such that the alternative set of locations of the touch events span a larger area of graphical keyboard 16B than the original locations of the touch events.

For example, a sequence of time-ordered touch events, having a quantity of "T" touch events in the sequence, may have "original" locations defined in a "series 1" as:

$[X_1, Y_1], [X_2, Y_2], \ldots, [X_{T-1}, Y_{T-1}], [X_T, Y_T]$

That is, the above original locations defined in series 1 represents the locations of unaltered touch events as determined by gesture module 24 based on data received from UID 12.

Keyboard module 22 may determine an alternative set of locations, based on the original locations of the sequence of time-ordered touch events, by increasing the original locations, by a factor of "n" where "n" represents a value greater than one. The alternative set of locations of the sequence of touch events may be defined in a "series 2" as:

$[X_1, Y_1], [X_1+n*(X_2-X_1), Y_1+n*(Y_2-Y_1)], \ldots, [X_{T-1}+n*(X_T-X_{T-1}), Y_{T-1}+n*(Y_T-Y_{T-1})]$ The distance that separates adjacent locations (e.g., $[X_1, Y_1]$ and $[X_2, Y_2]$) in series 2 is increased over the original distance by a factor of "n". Said another way, keyboard module 22 defines an alternative set of locations so as to to insert a greater amount of distance or spacing separating adjacent touch events in the original sequence of touch events.

Keyboard module 22 may rely on the alternative set of locations, rather than the original locations, to determine a selection of keys of gesture keyboard 16B. In other words, rather than map the original locations of a gesture to the locations of keys, keyboard module 22 performs alternative mapping techniques by mapping the alternative set of locations of a gesture to the locations of keys. In this way, rather than adopt a direct mapping of the original locations of a gesture to the locations of the keys to determine a selection, keyboard module 22 may an alternative set of locations of a gesture such that a smaller sized gesture can be used to span a greater area of gesture keyboard 16B and select keys that are further apart that could otherwise be used to span a similar sized area of a different keyboard and select similar keys that are further apart. By enabling computing device 10 to detect a selection of keys using a smaller sized gesture, keyboard module 22 may provide a way for a user of computing device 10 to enter text more quickly and/or with less effort.

The techniques are now further described in detail with reference to FIG. 1. In the example of FIG. 1, computing device 10 outputs, for display, a graphical keyboard comprising a plurality of keys. For example, keyboard module 22 may generate data that includes a representation of gesture keyboard 16B. UI module 20 may generate user interface 14 and include gesture keyboard 16B in user interface 14 based on the data representing gesture keyboard 16B. UI module 20 may send information to UID 12 that includes instructions for displaying user interface 14 at UID 12. UID 12 may receive the information and cause UID 12 to present user interface 14 including edit region 16A and gesture keyboard 16B. Gesture keyboard 16B may include a plurality of keys.

Computing device 10 may receive an indication of a gesture that traverses a first group of keys of the plurality of keys. For example, a user of computing device 10 may provide a gesture input that traverses across actual path 34. The gesture may begin at location 36A of UID 12 which is nearest to the location of the 'A' key and ends at location 36B of UID 12 which is nearest to the location of the 'G' key. The gesture traverses across a group of keys that include the 'A' key, the 'S' key, the 'D' key, the 'F' key, and the 'G' key.

Gesture module 24 may generate a sequence of touch events based on the gesture. UI module 20 may cause UID 12 to present a graphical indication of actual path 34 based on information received from gesture module 24 about the original locations of the gesture detected by UID 12. In some examples, UI module 20 may refrain from causing UID 12 to present actual path 34 based on the location information received from gesture module 24.

Responsive to receiving the indication of the gesture that traverses the first group of keys of the plurality of keys, computing device 10 may determine a second group of keys of the plurality of keys. At least one of the second group of keys is different from at least one of the first group of keys. For example, keyboard module 22 may determine a selection of keys from the plurality of keys of gesture keyboard 16B. Keyboard module 22 may receive information that includes the original locations of the touch events associated with the gesture provided along actual path 34.

Keyboard module 22 may determine an alternative set of locations based on the original locations of the touch events and cause the alternative set of locations to have an increased amount of spacing between the touch events. For instance, rather than utilize a one-to-one mapping ratio, keyboard module 22 may utilize an alternative mapping ratio that interprets the locations of the touch events of the gesture to be an alternative set of locations that include additional spacing or have an increased amount of distance between the touch events. In this way, keyboard module 22 may "expand" or "stretch" a received gesture such that the alternative set of touch events of the gesture cover a greater amount of area of gesture keyboard 16B than what was actually detected. The alternative set of locations of the touch events associated with the gesture detected between locations 36A and 36B of gesture keyboard 16B may represent a longer gesture that, if detected originally, would span between locations 36A and 36C of gesture keyboard 16B.

Keyboard module 22 may determine a selection of a second group of keys based on the alternative set of locations. For example, with the alternative set of locations spanning the 'A' key, the 'S' key, the 'D' key, the 'F' key, the 'G' key, the 'H' key, the 'L' key, the 'K' key, and the 'L' key, keyboard module 22 may determine a selection of the keys of gesture keyboard 16B that is different than a selection that keyboard module 22 determine from the original locations of the actual gesture that traversed across the group of keys that include the 'A' key, the 'S' key, the 'D' key, the 'F' key, and the 'G' key. Keyboard module 22 may identify one or more keys of gesture keyboard 16B that correspond to the alternative set of locations, rather than the original locations, of the sequence of touch events. Keyboard module 22 may rely on a spatial model, language model, or other technique to determine which keys are most likely being selected, given a sequence of touch events having the alternative set of locations.

Computing device 10 may output, for display, a virtual path traversing a respective location of each respective key of the second group of keys. In other words, keyboard module 22 may determine that the alternative set of locations span across the 'A' key, the 'S' key, the 'D' key, the 'F' key, the 'G' key, the 'H' key, the T key, the 'K' key, and the 'L' key. UI module 20 may cause UID 12 to present virtual path 32 based on location information received from keyboard module 22 about the re-defined locations of the gesture. Said differently, UI module 20 may cause UI 12 to present a virtual path or a "virtual trace" of an undetected gesture at locations of UID 12 to graphically depict where on gesture keyboard 16B that the user's gesture would have been detected, had the user provided the gesture at the alternative set of locations of UID 12.

In some examples, UI module 20 may refrain from causing UID 12 to present virtual path 32 based on the location information received from keyboard module 22. For example, computing device 10 may be configurable by a user to present or to refrain from presenting virtual path 34 after defining the alternative set of locations of touch events.

In some examples, keyboard module 22 may determine a character string based on the selection of keys that is determined from the alternative set of locations. In other words, keyboard module 22 may determine a character string based on the second set of keys, rather than the first set of keys that are nearest to the original locations of the gesture. For example, Keyboard module 22 may rely on a spatial model, language model, or other technique to determine text based on the selection of keys of the 'A' key, the 'S' key, the 'D' key, the 'F' key, the 'G' key, the 'H' key, the 'J' key, the 'K' key, and the 'L' key. Keyboard module 22 may determine that the characters a and l were most likely selected and determine that a character string or a candidate word is most likely all. Keyboard module 22 may provide UI module 20 with information indicating the character string all as the candidate word. UI module 20 may cause UID 12 to present the character string as candidate word 30 at edit region 16A.

In some examples, keyboard module 22 may refrain from determining, based on the first group of keys, a character string. Said differently, keyboard module 22 may disregard the original locations of the gesture and only determine character strings based on the alternative set of locations. In this way, keyboard module 22 may save computational resources by avoiding performing two determinations of character strings (e.g., one for the original set of locations and one for the alternative set of locations).

In this way, the techniques of the disclosure may enable a computing device to determine a selection of keys of a gesture keyboard from an input that is substantially smaller than typically required by other gesture keyboards. In this way, the computing device may receive input at a gesture keyboard in a shorter amount of time. In addition, a user can expend less effort and be less susceptible to friction forces that otherwise may occur if required to provide larger continuous gesture input.

Therefore, the techniques described in this disclosure may improve the speed with which a user can type a word at a gesture keyboard. As such, the computing device may receive fewer inputs from a user to enter text using a gesture keyboard. A computing device that receives fewer inputs may perform fewer operations and as such consume less electrical power.

Figure 2:
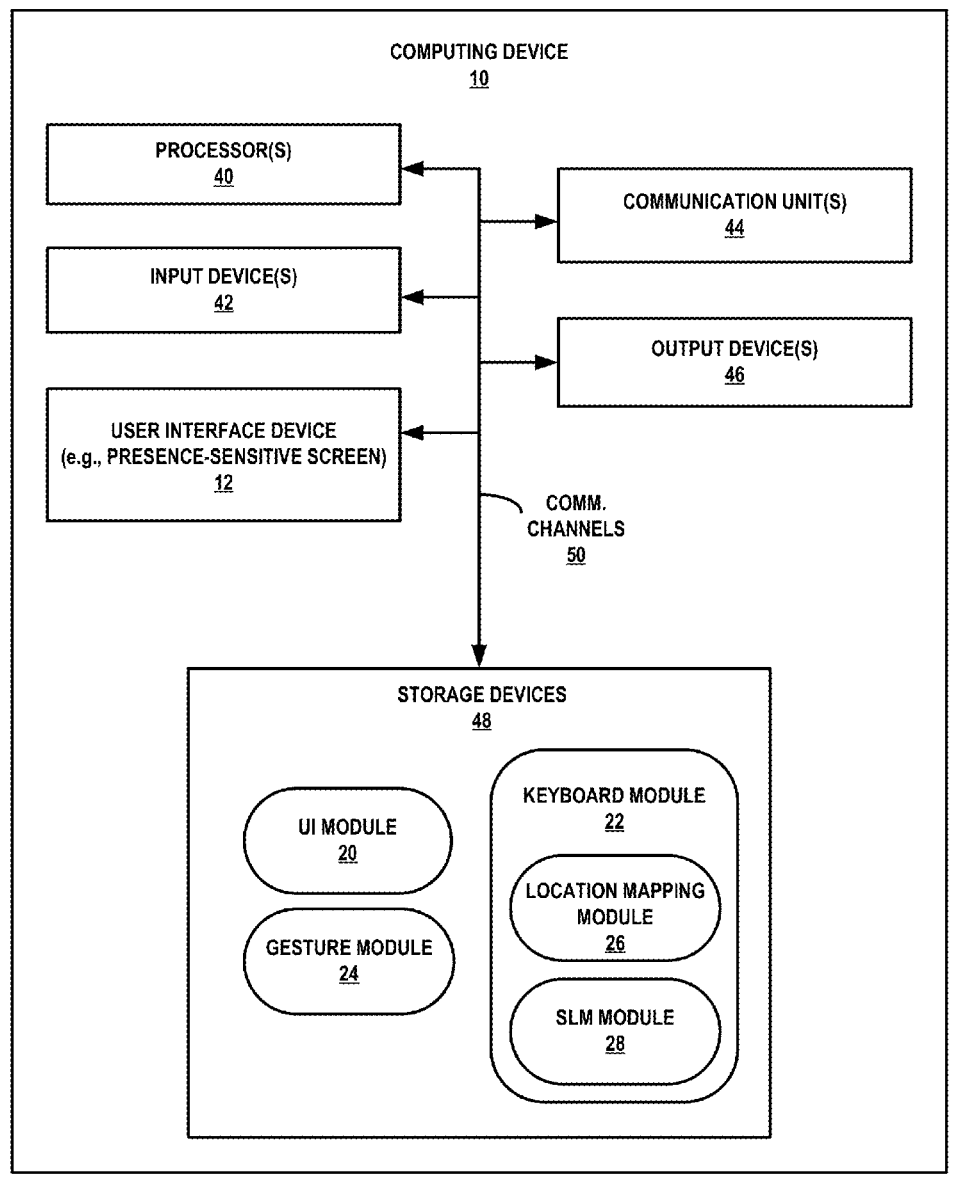
FIG. 2 is a block diagram illustrating an example computing device, in accordance with one or more aspects of the present disclosure.

FIG. 2 is a block diagram illustrating an example computing device, in accordance with one or more aspects of the present disclosure. Computing device 10 of FIG. 2 is described below within the context of FIG. 1. FIG. 2 illustrates only one particular example of computing device 10, and many other examples of computing device 10 may be used in other instances and may include a subset of the components included in example computing device 10 or may include additional components not shown in FIG. 2.

As shown in the example of FIG. 2, computing device 10 includes user interface device 12 ("UID 12"), one or more processors 40, one or more input devices 42, one or more communication units 44, one or more output devices 46, and one or more storage devices 48. Storage devices 48 of computing device 10 also include UI module 20, keyboard module 22, and gesture module 24. Keyboard module 22 includes location mapping module 26 ("mapping module 26") and spatial-language model module 28 ("SLM module 28"). Communication channels 50 may interconnect each of the components 12, 13, 20, 22, 24, 26, 28, 40, 42, 44, and 46 for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes a presence-sensitive input device (e.g., a touch sensitive screen, a presence-sensitive display), mouse, keyboard, voice responsive system, video camera, microphone or any other type of device for detecting input from a human or machine.

One or more output devices 46 of computing device 10 may generate output. Examples of output are tactile, audio, and video output. Output devices 46 of computing device 10, in one example, includes a presence-sensitive display, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more networks by transmitting and/or receiving network signals on the one or more networks. For example, computing device 10 may use communication unit 44 to transmit and/or receive radio signals on a radio network such as a cellular radio network. Likewise, communication units 44 may transmit and/or receive satellite signals on a satellite network such as a GPS network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, LTE, and Wi-Fi® radios found in mobile devices as well as Universal Serial Bus (USB) controllers.

In some examples, UID 12 of computing device 10 may include functionality of input devices 42 and/or output devices 46. In the example of FIG. 2, UID 12 may be or may include a presence-sensitive input device. In some examples, a presence-sensitive input device may detect an object at and/or near the presence-sensitive input device. As one example range, a presence-sensitive input device may detect an object, such as a finger or stylus that is within two inches or less of the presence-sensitive input device. The presence-sensitive input device may determine a location (e.g., an [x,y] coordinate) of the presence-sensitive input device at which the object was detected. In another example range, a presence-sensitive input device may detect an object six inches or less from the presence-sensitive input device and other ranges are also possible. The presence-sensitive input device may determine the location of the input device selected by a user's finger using capacitive, inductive, and/or optical recognition techniques. In some examples, presence-sensitive input device provides output to a user using tactile, audio, or video stimuli as described with respect to output device 46. In the example of FIG. 2, UID 12 presents a user interface (such as user interface 14 of FIG. 1) at UID 12.

While illustrated as an internal component of computing device 10, UID 12 also represents an external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 represents an external component of computing device 10 located outside and physically separated from the packaging of computing device 10 (e.g., a monitor, a projector, etc. that shares a wired and/or wireless data path with a tablet computer).

One or more storage devices 48 within computing device 10 may store information for processing during operation of computing device 10. In some examples, storage device 48 is a temporary memory, meaning that a primary purpose of storage device 48 is not long-term storage. Storage devices 48 on computing device 10 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with UI module 20, keyboard module 22, gesture module 24, mapping module 26, and SLM module 28.

One or more processors 40 may implement functionality and/or execute instructions within computing device 10. For example, processors 40 on computing device 10 may receive and execute instructions stored by storage devices 48 that execute the functionality of UI module 20, keyboard module 22, gesture module 24, mapping module 26, and SLM module 28. These instructions executed by processors 40 may cause computing device 10 to store information, within storage devices 48 during program execution. Processors 40 may execute instructions of modules 20-28 to cause UID 12 to display user interface 14 at UID 12. That is, modules 20-28 may be operable by processors 40 to perform various actions, including receiving an indication of a gesture at locations of UID 12 and causing UID 12 to present user interface 14 at UID 12.

In accordance with aspects of this disclosure computing device 10 of FIG. 2 may output for display at UID 12 a graphical keyboard comprising a plurality of keys. For example, during operational use of computing device 10, keyboard module 22 may cause UI module 20 of computing device 10 to output a keyboard layout (e.g., an English language QWERT keyboard, etc.) for display at UID 12. UI module 20 may receive data specifying the keyboard layout from keyboard module 22 over communication channels 50. UI module 20 may use the data to generate user interface 14 including edit region 16A and the plurality of keys of the keyboard layout from keyboard module 22 as gesture keyboard 16B. UI module 20 may transmit data over communication channels 50 to cause UID 12 to present user interface 14 at UID 12. UID 12 may receive the data from UI module 20 and cause UID 12 to present user interface 14.

Computing device 10 may receive an indication of a gesture that traverses a first group of keys of the plurality of keys. For example, a user of computing device 10 may provide a gesture input that traverses across actual path 34. The gesture may begin at location 36A of UID 12 which is nearest to the location of the 'A' key and ends at location 36B of UID 12 which is nearest to the location of the 'G' key. The gesture traverses across a group of keys that include the 'A' key, the 'S' key, the 'D' key, the 'F' key, and the 'G' key.

Gesture module 24 may generate a sequence of touch events based on the gesture. UI module 20 may cause UID 12 to present a graphical indication of actual path 34 based on information received from gesture module 24 about the original locations of the gesture detected by UID 12. In some examples, UI module 20 may refrain from causing UID 12 to present actual path 34 based on the location information received from gesture module 24.

Responsive to receiving the indication of the gesture that traverses the first group of keys of the plurality of keys, computing device 10 may determine a second group of keys of the plurality of keys. At least one of the second group of keys is different from at least one of the first group of keys. For example, keyboard module 22 may determine a selection of keys from the plurality of keys of gesture keyboard 16B based on the information that keyboard module 22 receives from gesture module 24 that includes the original locations of the touch events associated with the gesture provided along actual path 34.

Keyboard module 22 may rely on mapping module 26 to determine an alternative set of locations based on the original locations of the touch events and cause the alternative set of locations to have an increased amount of spacing between the touch events. For instance, rather than utilize a one-to-on mapping ratio, mapping module 26 may utilize an alternative mapping ratio that interprets the locations of the touch events of the gesture to be an alternative set of locations that include additional spacing or have an increased amount of distance between the touch events. In this way, mapping module 26 may "expand" or "stretch" a received gesture such that the alternative set of touch events of the gesture cover a greater amount of area of gesture keyboard 16B than what was actually detected. The alternative set of locations of the touch events associated with the gesture detected between locations 36A and 36B of gesture keyboard 16B may represent a longer gesture that, if detected originally, would span between locations 36A and 36C of gesture keyboard 16B.

Keyboard module 22 may utilize spatial model and/or language model functionality of SLM module 28 to determine a selection of a second group of keys based on the alternative set of locations. For example, with the alternative set of locations spanning the 'A' key, the 'S' key, the 'D' key, the 'F' key, the 'G' key, the 'H' key, the 'L' key, the 'K' key, and the 'L' key, SLM module 28 may determine a selection of the keys of gesture keyboard 16B that is different than a selection that keyboard module 22 would otherwise determine from the original locations of the actual gesture that traversed across the group of keys that include the 'A' key, the 'S' key, the 'D' key, the 'F' key, and the 'G' key. SLM module 28 may identify one or more keys of gesture keyboard 16B that correspond to the alternative set of locations, rather than the original locations, of the sequence of touch events.

A spatial model of SLM module 28 may interpret the alternative set of touch events received from mapping module 26 as a selection of individual keys of gesture keyboard 16B. The spatial model of SLM module 28 may compare each alternative location to each key location to determine one or more keys that share the same approximate locations of UID 12 as the locations of touch events in the sequence of touch events.

For example, SLM module 28 may determine a Euclidian distance between the alternative set of locations and the location of each key of graphical keyboard 16B. Based on these Euclidian distances, and for each key, SLM module 28 may determine a spatial model probability that the alternative set of locations correspond to a selection of the key. In other words, SLM module 28 may compare each location from the alternative set of locations to each key location, and for each key, generate a spatial model probability that a selection of that key occurred.

In some examples, the alternative set of locations may each include an (x,y) coordinate location with respect to UID 12. A key location (e.g., a centroid of a key) may include its own (x,y) location with respect to UID 12. SLM module 28 may determine a probability that one or locations from the alternative set of locations correspond to a selection of a key based on a Euclidian distance between the key location and the one or locations from the alternative set of locations. SLM module 28 may correlate a higher probability to a key that shares a smaller Euclidian distance with the one or locations from the alternative set of locations than a key that shares a greater Euclidian distance with the one or locations from the alternative set of locations (e.g., the probability of a key selection may exceed ninety nine percent when a key shares a near zero Euclidian distance to the one or locations from the alternative set of locations and the probability of the key selection may decrease proportionately with an increase in the Euclidian distance).

Based on the spatial model probability associated with each key, SLM module 28 may assemble the individual key selections with the highest spatial model probabilities into a time-ordered sequence of keys. SLM module 28 may include each key with a non-zero spatial model probability (e.g., a key with a greater than zero percent likelihood that the alternative set of locations represent selections of the keys) in a sequence of keys.

SLM module 28 may associate the alternative set of locations, and the time, action, and characteristic components of the one or more touch events in the sequence of touch events gesture module 24 determined from the original gesture, with a corresponding key in the sequence. If multiple touch events corresponds to a key, SLM module 28 may combine (e.g., average) similar components of the multiple touch events into a single corresponding component (e.g., as a single characteristic component that includes information about an input at UID 12 to select the key). In other words, each key in the sequence of keys may inherit the information about the characteristics of the gestures or input at UID 12 associated with the one or more corresponding touch events from which the key was derived.

Keyboard module 22 may utilize a language module of SLM module 28 to refine the selection of keys and/or to determine at least one candidate word from the selection of keys determined from the alternative set of locations. For example, SLM module 28 of keyboard module 22 may perform a look up within one or more lexicon data stores to identify one or more candidate words stored at the one or more lexicon data stores that begin with the letter a associated with the first key in the sequence, end with the letter l associated with the last key in the sequence, and that may or may not include any of the letters s-d-f-g-h-j-k that correspond to each of the keys in the sequence in-between the first and last keys. SLM module 28 may identify the candidate words ask, asks, sadly, sad, all, etc. as some example candidate words in the one or more lexicon data stores that begin and end with the letters a-l.

SLM module 28 of keyboard module 22 may determine the one or more candidate words from one or more lexicon data stores that have a highest probability of being the candidate words that a user may wish to enter by providing input at gesture keyboard 16B. The probability may indicate a frequency of use of each candidate word in a language context. That is, SLM module 28 may determine that one or more candidate words that have a greatest likelihood of being the word that a user may wish to enter at edit region 16A are the one or more candidate words that appear most often during an instance of written and/or spoken communication using a particular language.

In some examples, a "candidate word" determined from one or more lexicon data stores may comprise a phrase or multiple words. For instance, while SLM module 28 may identify one of the candidate words that begin with the letters a-l as being the word all, in some examples, SLM module 28 may determine that the phrase all aboard or all alone are also each individual "candidate words" that begin with the letters a-l. Said differently, the techniques described in this disclosure are applicable to candidate word prediction and phrase prediction comprising multiple candidate words. For every instance in which a computing device determines a "candidate word" the computing device may be determine a candidate word that comprises a partial candidate word or a candidate phrase made of two or more words.

SLM module 28 may refine the selection of keys determined from the alternative set of locations by determining a selection of keys required to enter a highest probability candidate word or a candidate word having a probability that satisfies a threshold. In other words, if SLM module 28 determines that the probability associated with a candidate word does not satisfy a threshold (e.g., fifty percent), SLM module 28 may not alter the selection of keys and rely primarily on the alternative set of locations in determining the selection of keys. If however SLM module 28 determines that the probability associated with a candidate word does satisfy a threshold or is higher than the probability associated with any other candidate words, SLM module 28 may alter the selection of keys to be not only a selection of keys determined from the alternative set of locations, but also a selection of keys that is required to input the candidate word.

In some examples, the language model of SLM module 28 may be an n-gram language model. SLM module 25 may rely on the n-gram language model to determine a probability that each candidate word appears in a sequence of words including the candidate word. SLM module 28 may determine the probability of each candidate word appearing subsequent to or following one or more words entered at edit region 16A just prior to the detection of the gestures associated with the original locations from which the alternative set of locations was derived.

For instance, SLM module 28 may determine one or more words entered within edit region 16A prior to receiving the gesture from which the alternative set of locations was derived and determine, based on the one or more previous words, a probability that the alternative set of locations derived from the gesture is associated with a selection of keys for entering each candidate word. SLM module 28 may determine the previous word you was entered prior to detecting the gesture and assign a high probability to the candidate word all since SLM module 28 may determine that the phrase you all is a common phrase. SLM module 28 may determine the previous words I feel were entered prior to detecting the gesture and determine that the word sad has a high probability of being the word associated with the gesture after determining the phrase I feel sad is more likely than the phrase I feel all.

Keyboard module 22 may cause UI module 20 to present candidate word 30, determined from the alternative set of locations, at edit region 16A. For example, keyboard module 22 may send information via communication channel 50 that causes UI module 20 to cause UID 12 to present candidate word 30 as a string of text at edit region 16A.

Computing device 10 may output, for display, a virtual path traversing a respective location of each respective key of the second group of keys. In other words, based on the determinations made by mapping module 26 and/or SLM module 28, keyboard module 22 may determine that the alternative set of locations span across the 'A' key, the 'S' key, the 'D' key, the 'F' key, the 'G' key, the 'H' key, the 'L' key, the 'K' key, and the 'L' key. UI module 20 may cause UID 12 to present virtual path 32 based on location information received from keyboard module 22 about the re-defined locations of the gesture. Said differently, UI module 20 may cause UI 12 to present a virtual path of an undetected gesture at locations of UID 12 to graphically depict where on gesture keyboard 16B that the user's gesture would have been detected, had the user provided the gesture at the alternative set of locations of UID 12.

In some examples, mapping module 26 may assist keyboard module 22 in determining the second group of keys by adjusting the original locations of the gesture by a factor to determine the alternative set of locations. Said differently, by relying on mapping module 26 keyboard module 22 may determine, based on the gesture, a first set of locations of graphical keyboard 16B (e.g., the original locations determined by gesture module 24) and determine, based on the first set of locations, a second set of locations (e.g., an alternative set of locations) such that the second set of locations is different from the first set of locations by a factor (e.g., 'n').

In some examples, the factor may correspond to a linear function being applied to the original locations of the gesture. For example, mapping module 26 may add the factor to one or more of the original locations to determine the alternative set of locations. Mapping module 26 may subtract the factor from one or more of the original locations to determine the alternative set of locations. In some examples, the factor may multiply or divide one or more of the original locations by the factor to determine the alternative set of locations. In some examples, the factor may correspond to a non-linear function being applied to the original locations of the gesture. For example, mapping module 26 may input the one or more coordinate locations originally derived by gesture module 24 from the gesture into a non-linear mapping function (that produces non-linear output rather than a linear constant/multiplier output) that outputs the alternative set of locations.

In some examples, mapping module 26 may determine the factor based at least in part on one or more characteristics of the gesture. The one or more characteristics of the gesture may include at least one of: a speed of the gesture, a location of the gesture, a direction of the gesture, and/or a shape of the gesture. For example, keyboard module 22 may receive information about the speed, location, direction, and/or shape associated with the gesture. Mapping module 26 may adjust the factor by an amount that is proportionate to the speed, location, direction, and/or shape. For instance, if the speed of the gesture satisfies a speed threshold, mapping module 26 may utilize a larger factor than if the speed of the gesture does not satisfy the speed threshold. In this way, a faster gesture may result in an alternative set of locations that are a greater distance from the original locations than a slower gesture. In some examples, the alternative may be true, such that a slower gesture may result in an alternative set of locations that are a shorter distance from the original locations than a faster gesture In some examples, mapping module 26 may "dynamically" determine the factor used to map the original locations to an alternative set of locations. That is, mapping module 26 may not merely retrieve and use a stored value as the factor, but rather may compute the factor during operation of mapping module 26 based on one or more data. For example, mapping module may set, based at least in part on the one or more characteristics of the gesture at an initial time, the factor to an initial value, and then set, based at least in part on the one or more characteristics of the gesture at a subsequent time, the factor to a subsequent value. In other words, during an initial portion of the gesture mapping module 26 may utilize an initial factor to map the original locations to an alternative set of locations and during a subsequent portion of the gesture, mapping module 26 may dynamically modify the factor to match the one or more characteristics of the gesture during different portions of the gesture, and map the original locations to an alternative set of locations using the modified factor.

The factor (also referred to as the "mapping ratio") may change according to the speed of the gesture. If the gesture is moving fast, we a larger factor may be used and if the gesture slows down, a smaller factor may be used. In this way mapping module 26 may compensate for one example in which a user typically moves his or her finger fast to reach a kay that is farther away. In some examples, having a larger n value or factor may help a virtual path, as its being output for display at UID 12, appear to more quickly reach an intended key. In contrast, if the user's finger moves slowly, a smaller n or factor may be used since the user may wish to have finer control of the virtual gesture and its appearance at UID 12. Mapping module 26 may further utilize similar techniques employed by other input devices (e.g., to control a cursor position on a screen as a person moves a mouse input device) to dynamically change the factor.

In some examples, the factor used by mapping module 26 may be predefined, user-defined, set by the manufacturer of computing device 10, dynamically adjusted by computing device 10 or a user of computing device 10, or updated with a change to a software, hardware, or firmware configuration of computing device 10. In some examples, mapping module 26 may "learn" or determine the factor based on previous user interactions with computing device 10. For example, mapping module 26 may determine that if a user's movements in providing a gesture are initially too slow, to short, etc. resulting in frequent inputs to correct the selection determined from the alternative set of locations, then mapping module 26 may increase the factor. Alternatively, mapping module 26 may determine that if a user's movements in providing a gesture are initially too fast, to long, etc. resulting in frequent inputs to correct the selection determined from the alternative set of locations, then mapping module 26 may decrease the factor.

In some examples, mapping module 26 may rely on input from SLM module 28 to dynamically adjust the factor. For examples, mapping module 26 may dampen or amplify a factor in response to language model module probability scores received from SLM module 28 about a determined set of alternative locations. If a user continues to provide gesture input, and SLM module 28 continues to determine different candidate words having different language model module probability, mapping module 26 may increase or decrease the factor based on the change to the probability. The resulting effect may appear that mapping module 26, in conjunction with SLM module 28, may cause the alternative set of locations to produce a selection of keys that more closely match a highest candidate word from a lexicon.

In this way, unlike a typical gesture keyboard that adopts a one-to-one "direct mapping" ratio between a physical finger movement and a generated gesture strokes and at times requires the finger to physically travel a long distance (e.g., if letters are far from each other), computing device 10 may allow for "accelerated gesture typing" by adopting an alternative mapping ratio between the physical finger movements and the gesture traces so that user does not have to move his or her finger as far. As a result, computing device 10 may improve the speed with which a user can type a word using gesture keyboard 16B. As such, computing device 10 may receive fewer inputs from a user to enter text using gesture keyboard 16B and by receiving fewer inputs, computing device 10 may perform fewer operations and as such consume less electrical power than other computing devices.

Figure 3:
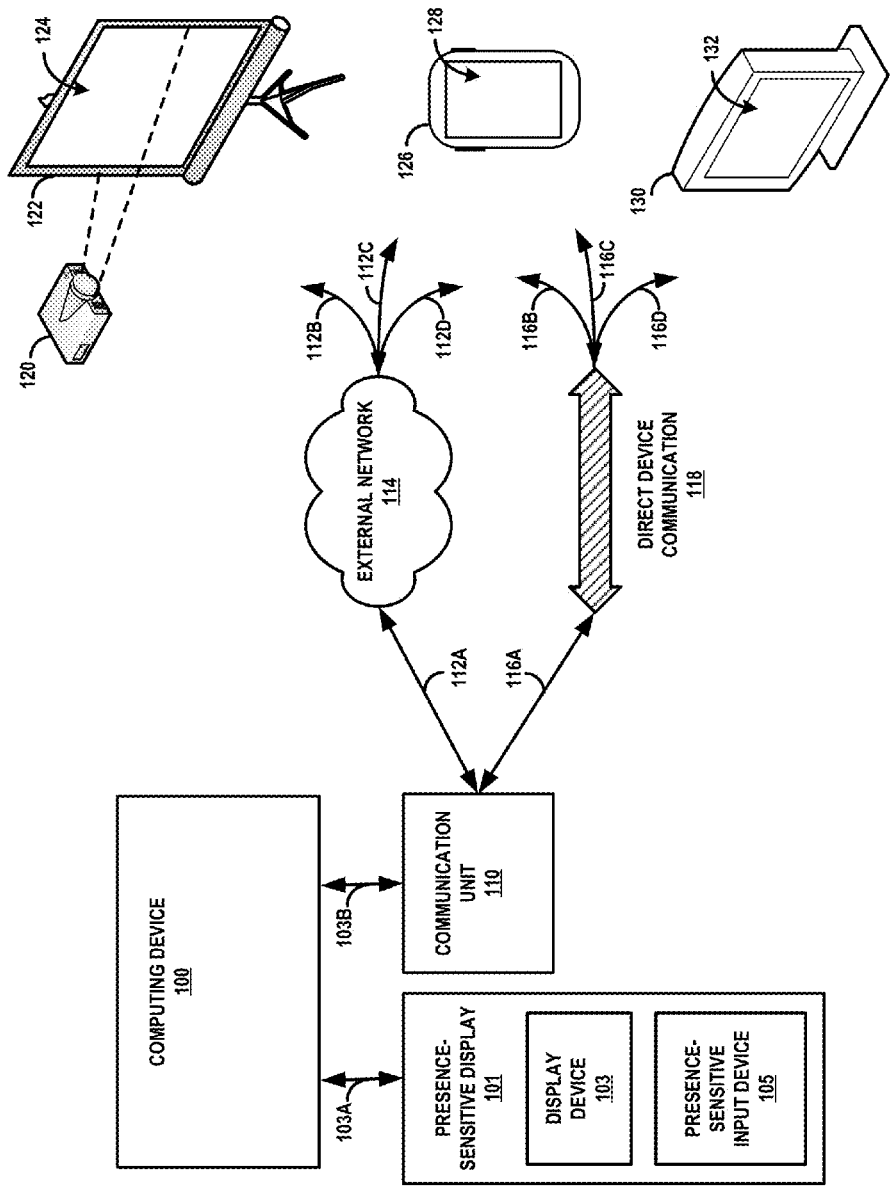
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc.

The example shown in FIG. 3 includes a computing device 100, presence-sensitive display 101, communication unit 110, projector 120, projector screen 122, tablet device 126, and visual display device 130. Although shown for purposes of example in FIGS. 1 and 2 as a stand-alone computing device 10, a computing device, such as computing device 100 and/or computing device 10, may generally refer to any component or system that includes a processor or other suitable computing environment for executing software instructions and, for example, need not include a presence-sensitive display.

As shown in the example of FIG. 3, computing device 100 may be a processor that includes functionality as described with respect to processors 40 in FIG. 2. In such examples, computing device 100 may be operatively coupled to presence-sensitive display 101 by a communication channel 103A, which may be a system bus or other suitable connection. Computing device 100 may also be operatively coupled to communication unit 110, further described below, by a communication channel 103B, which may also be a system bus or other suitable connection. Although shown separately as an example in FIG. 3, computing device 100 may be operatively coupled to presence-sensitive display 101 and communication unit 110 by any number of one or more communication channels.

In other examples, such as illustrated previously by computing devices 10 in FIGS. 1-2, computing device 100 may be a portable or mobile device such as mobile phones (including smart phones), laptop computers, etc. In some examples, computing device 100 may be a desktop computers, tablet computers, smart television platforms, cameras, personal digital assistants (PDAs), servers, mainframes, etc.

Presence-sensitive display 101, like UID 12 as shown in FIG. 1, may include display device 103 and presence-sensitive input device 105. Display device 103 may, for example, receive data from computing device 100 and display the graphical content. In some examples, presence-sensitive input device 105 may determine one or more user inputs (e.g., continuous gestures, multi-touch gestures, single-touch gestures, etc.) at presence-sensitive display 101 using capacitive, inductive, and/or optical recognition techniques and send indications of such user input to computing device 100 using communication channel 103A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed.

As shown in FIG. 3, computing device 100 may also include and/or be operatively coupled with communication unit 110. Communication unit 110 may include functionality of communication unit 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3G, 4G, LTE, and Wi-Fi radios, Universal Serial Bus (USB) interfaces, etc. Computing device 100 may also include and/or be operatively coupled with one or more other devices, e.g., input devices, output devices, memory, storage devices, etc. that are not shown in FIG. 3 for purposes of brevity and illustration.

FIG. 3 also illustrates a projector 120 and projector screen 122. Other such examples of projection devices may include electronic whiteboards, holographic display devices, and any other suitable devices for displaying graphical content. Projector 120 and project screen 122 may include one or more communication units that enable the respective devices to communicate with computing device 100. In some examples, the one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more user inputs (e.g., continuous gestures, multi-touch gestures, single-touch gestures, etc.) at projector screen using optical recognition or other suitable techniques and send indications of such user input using one or more communication units to computing device 100.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic whiteboard), may receive data from computing device 100 and display the graphical content. In some examples, presence-sensitive display 124 may determine one or more user inputs (e.g., continuous gestures, multi-touch gestures, single-touch gestures, etc.) at projector screen 122 using capacitive, inductive, and/or optical recognition techniques and send indications of such user input using one or more communication units to computing device 100.

FIG. 3 also illustrates tablet device 126 and visual display device 130. Tablet device 126 and visual display device 130 may each include computing and connectivity capabilities. Examples of tablet device 126 may include e-reader devices, convertible notebook devices, hybrid slate devices, etc. Examples of visual display device 130 may include televisions, computer monitors, etc. As shown in FIG. 3, tablet device 126 may include a presence-sensitive display 128. Visual display device 130 may include a presence-sensitive display 132. Presence-sensitive displays 128, 132 may include a subset of functionality or all of the functionality of UI device 4 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, tablet device 126, and visual display device 130. For instance, computing device 100 may execute one or more instructions to generate and/or modify graphical content in accordance with techniques of the present disclosure. Computing device 100 may output the data that includes the graphical content to a communication unit of computing device 100, such as communication unit 110. Communication unit 110 may send the data to one or more of the remote devices, such as projector 120, projector screen 122, tablet device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 103A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 3 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 3. In some examples, network links 112A-112D may be Ethernet, ATM or other network connections. Such connections may be wireless and/or wired connections.

In some examples, computing device 100 may be operatively coupled to one or more of the remote devices included in FIG. 3 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, Wi-Fi, infrared, etc. One or more of the remote devices illustrated in FIG. 3 may be operatively coupled with computing device 100 by communication links 116A-116D. In some examples, communication links 112A-112D may be connections using Bluetooth, Near-Field Communication, Universal Serial Bus, infrared, etc. Such connections may be wireless and/or wired connections.

In accordance with techniques of the disclosure, computing device 100 may be operatively coupled to visual display device 130 using external network 114. Computing device 100 may output a gesture keyboard for display at presence-sensitive display 132. For instance, computing device 100 may send data that includes a representation of gesture keyboard 16B to communication unit 110. Communication unit 110 may send the data that includes the representation of gesture keyboard 16B to visual display device 130 using external network 114. Visual display device 130, in response to receiving the data using external network 114, may cause presence-sensitive display 132 to output gesture keyboard 16B comprising a plurality of keys.

In response to a user performing first gesture at presence-sensitive display 132 to select a first group of keys of the keyboard (e.g., the <A-Key> followed by the <S-key>, the <D-key>, the <F-key>, and the <G-key>) visual display device 130 may send an indication of the gesture to computing device 100 using external network 114. Communication unit 110 of may receive the indication of the gesture, and send the indication to computing device 100.

After receiving the indication of the gesture, computing device 100 may determine a second selection of the keys of graphical keyboard 16B. For example, computing device 100 may determine an alternative set of locations based on the indication of the gesture received via communication unit 110. Based on the alternative set of locations, computing device 100 may determine a second group of keys of the keyboard (e.g., the <A-Key> followed by the <S-key>, the <D-key>, the <F-key>, the <G-key>, the <H-key>, the <J-key>, the <K-key>, and the <L-key>).

Computing device 100 may output data indicative of a virtual path that traverses the second group of keys, to visual display device 130 using communication unit 110 and external network 114 to cause visual display device 130 to output a graphical indication of the virtual path, for display at presence-sensitive display 132. For example, display device 130 may cause presence-sensitive display 132 to present a line segment as a graphical indication of the virtual path that traverses over the <A-Key> the <S-key>, the <D-key>, the <F-key>, the <G-key>, the <H-key>, the <J-key>, the <K-key>, and the <L-key> of graphical keyboard 16B.

Figure 4:
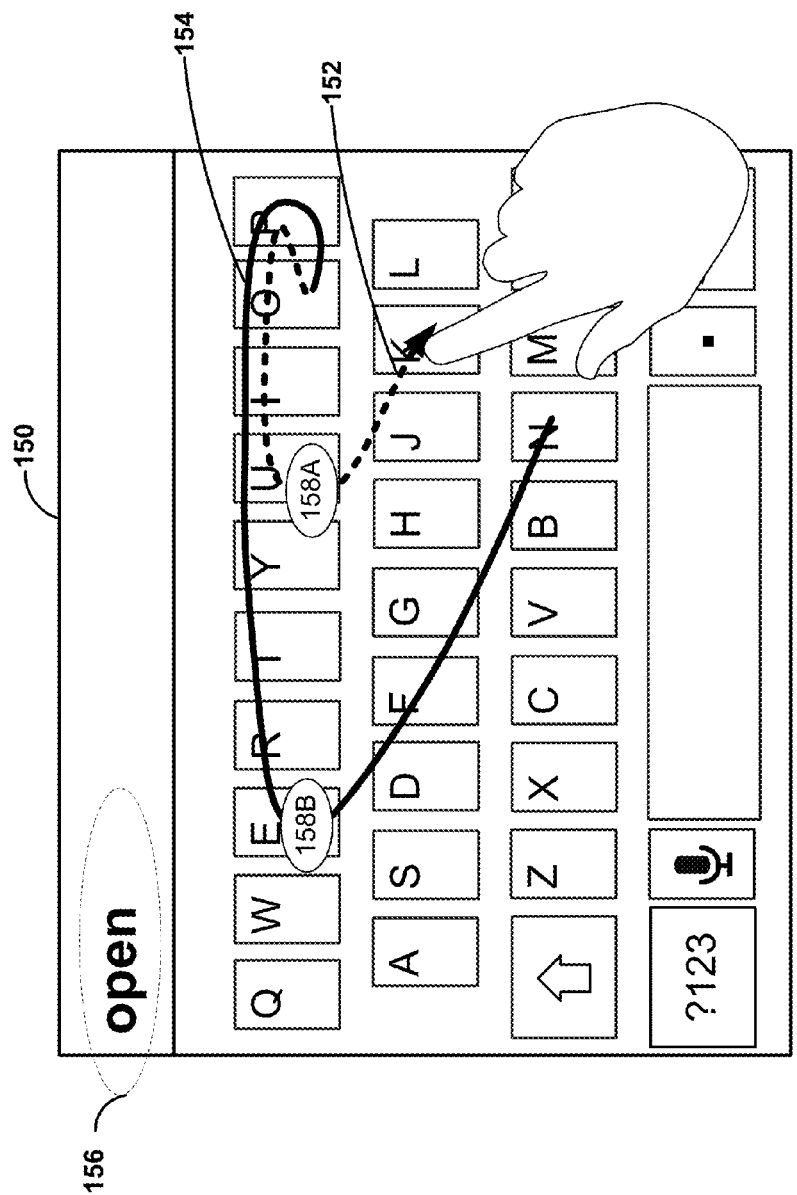
FIG. 4 is a conceptual diagram illustrating example graphical user interface for presenting a virtual path that traverses a group of keys of a gesture keyboard, in accordance with one or more aspects of the present disclosure.

FIG. 4 is a conceptual diagram illustrating example graphical user interface for presenting a virtual path that traverses a group of keys of a gesture keyboard, in accordance with one or more aspects of the present disclosure. FIG. 4 is described below in the context of computing device 10 (described above) from FIG. 1 and FIG. 2.

FIG. 4 illustrates that computing device 10 may output graphical user interface 150 for display (e.g., at UID 12). Graphical user interface 150 includes a gesture keyboard which has a plurality of keys. Computing device 10 may receive an indication of a gesture detected at locations of UID 12 that correspond to locations where a first group keys of the gesture keyboard of user interface 150 are being displayed. In some examples, computing device 10 may cause UID 12 to present actual path 152 as a form of visual feedback to indicate to a user of computing device 10, where at UID 12, does computing device 10 detect the original locations of the gesture.

Based on the gesture detected at locations of UID 12 that correspond to actual path 152, computing device 10 may determine a second selection of keys of the graphical keyboard of user interface 150. For example, rather that utilize direct mapping techniques to map original locations of a detected gesture to a selection of keys of a graphical keyboard, computing device 10 may rely on alternative mapping techniques and determine an alternative set of locations based on the detected gesture and map a selection of keys to the alternative set of locations, rather than the original set of locations.

In some examples, an initial key of the first and second groups is a same key. For example, computing device 10 may appear to expand or contract the size of a gesture by mapping the gesture to a different set of keys from the set of keys that were, for example, nearest to the gesture or at least based on the original locations of the gesture, and presenting virtual path 154 at the alternative set of locations. However, computing device 10 may cause the initial key of the selection determined from the alternative set of locations to be the same key that would have been determined from the original set of locations if direct mapping were used. FIG. 4 shows the <O-key> of the gesture keyboard of graphical user interface 150 being the initial key in the selection of keys associated with actual path 152 as well as virtual path 154.

In some examples, a shape of the virtual path has a same quantity of inflection points as a shape of the gesture and/or the shape of the virtual path has a same degree of curvature as the shape of the gesture. For example, in determining the alternative set of locations based on a gesture, mapping module 26 may generate an alternative set of locations that share a similar shape to the original locations of the gesture based on the information originally received from gesture module 24. For instance, in generating the alternative set of locations, mapping module 26 may reproduce similar changes in direction from one location to the next that gesture module 24 determined from the original gesture. In this way, the user may provide a continuous-gesture input, using a similar shape, but merely a reduced or different size, to more easily perform a selection of a group of keys that are further apart. FIG. 4 shows inflection point 158A of actual path 152 approximately matching inflection point 158B of virtual path 154.

In some examples, a length of the virtual path is larger than a length of the gesture. For example, mapping module 24, in determining the alternative set of locations, may introduce an amount of distance between two locations in the sequence of touch events detected by gesture module 24 to cause a conceptual increase in size (e.g., length) to the gesture.

In some examples, computing device 10 may determine the alternative set of locations and a second group of keys by at least determining one or more distances between portions of the gesture, and determining, based on the one or more distances, the second group of keys. For example, computing device 10 may multiply, based on a factor, the one or more distances, and the second group of keys may be further determined based on the one or more distances after the one or more distances are multiplied by the factor.

In other words, given an original set of locations defined in "series 1" of FIG. 1 (e.g., $[X_1, Y_1], [X_2, Y_2], \ldots, [X_{T-1}, Y_{T-1}], [X_T, Y_T]$), mapping module 26 of computing device 10 may determine an alternative set of locations defined by "series 2" of FIG. 1 (e.g., $[X_1, Y_1], [X_1+n*(X_2-X_1), Y_1+n*(Y_2-Y_1)], \ldots, [X_{T-1}+n*(X_T-X_{T-1}), Y_{T-1}+n*(Y_T-Y_{T-1})]$). To determine the alternative set of locations defined by series 2, from the original locations defined by series 1, mapping module 26 may determine the original distance that separates adjacent locations (e.g., $[X_1, Y_1]$ and $[X_2, Y_2]$) in series 1 and increase the original distance by a multiplication factor of "n". Said another way, mapping module 26 may define an alternative set of locations having a distance increase, over the original, by an amount approximately equal to $n*(X_T-X_{T-1})$, where n is a number greater than 1. In some examples, n may be less than one and the alternative set of locations may correspond to a set of locations that span a smaller area of a presence-sensitive display than the original set of locations at which the original set of locations were detected.

In some examples, computing device 10 may determine the factor n based on a speed of the gesture or other characteristic of the gesture. Computing device 10 may dynamically update and determine the factor as characteristics of the gesture change. For instance, if a gesture starts fast computing device 10 may rely on an initial factor, and as the gesture slows, computing device 10 may rely on a subsequent, different factor.

In some examples, responsive to determining that the speed satisfies a threshold, computing device 10 may increase the factor. Responsive to determining that the speed does not satisfy the threshold, computing device 10 may decrease the factor. In other words, if computing device 10 detects a fast moving gesture that exceeds a predefined or user-defined speed threshold, computing device 10 may cause mapping module 26 to rely on a larger factor and increase the distance between consecutive alternative locations. If computing device 10 detects a slow moving gesture that is less than a predefined or user-defined speed threshold, computing device 10 may cause mapping module 26 to rely on a smaller factor and decreases (or does not increase as much as a fast gesture) the distance between consecutive alternative locations.

In some examples, computing device 10 determines, based on a size of the screen, the factor. For example, computing device 10 may determine the size (e.g., pixel size, physical height, physical width, physical depth, etc.) of the screen of the display device at which user interface 150 is displayed. Computing device 10 may determine whether the size is large (e.g., for a tablet computer, a projection screen, etc.) or the size indicates the screen is small (e.g., for a mobile phone, a watch, etc.). Computing device 10 may adjust the factor used by mapping module 26 based on the size of the display. For instance, computing device 10 may cause mapping module 26 to utilize a larger factor to determine an alternative set of locations when user interface 150 is presented at a screen of a tablet computer and a smaller factor to determine the alternative set of locations when user interface 150 is presented at a screen of a mobile phone. In this way, the user can more easily provide continuous gestures at a gesture keyboard without expending a lot of effort or being exposed to potentially uncomfortable friction forces that he or she may otherwise experience with other computing devices.

Figure 5:
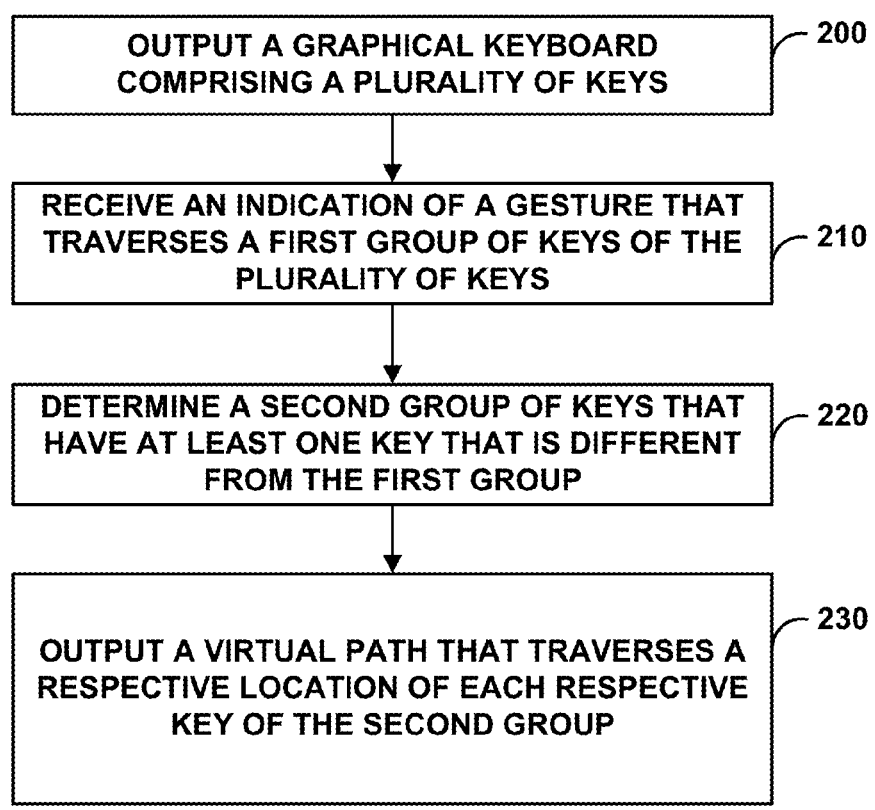
FIG. 5 is a flowchart illustrating an example operation of the computing device, in accordance with one or more aspects of the present disclosure.

FIG. 5 is a flowchart illustrating an example operation of the computing device, in accordance with one or more aspects of the present disclosure. The process of FIG. 5 may be performed by one or more processors of a computing device, such as computing device 10 illustrated in FIG. 1 and FIG. 2. For purposes of illustration only, FIG. 5 is described below within the context of computing device 10 of FIG. 1 and FIG. 2 and user interface 150 of FIG. 4.

FIG. 5 illustrates that computing device 10 may output a gesture keyboard comprising a plurality of keys (200). For example, UI module 20 of computing device 10 may cause UID 12 to present graphical user interface 150 including a gesture keyboard.

Computing device 10 may receive an indication of a gesture that traverses a first group of keys of the plurality of keys (210). For example, a user of computing device 10 may wish to enter the character string open. Computing device 10 may receive an indication of gestures 2 as the swipes across locations of UID 12 at which the <O-key>, the <P-key>, the <O-key>, the <I-key>, the <U-key>, the <J-key>, and the <K-key> are displayed. Gesture module 24 may determine original locations of a sequence of touch events associated with the gesture and transmit information about the original locations to mapping module 26.

Computing device 10 may determine a second group of keys that have at least one key that is different from the first group (220). For example, utilizing alternative mapping techniques, rather than one-to-one mapping, mapping module 26 may determine a second group of keys based on original locations of a sequence of touch events associated with the gesture that is different from the first group of keys that was traversed by the gesture. For example, mapping module 26 may increase the distance separating the touch events in the sequence associated with the gesture by a factor and determine a group of keys based on the alternative locations that define a selection of the <O-key>, the <P-key>, the <O-key>, the <I-key>, the <U-key>, the <Y-key>, the <T-key>, the <R-key>, the <E-key>, the <D-key>, the <F-key>, the <G-key>, the <B-key>, and the <N-key>. In some examples, mapping module 26 may adjust the factor used in determining the alternative set of locations based on input from a language model. For example, mapping module 26 may fit the alternative set of locations to keys that if selected, would produce candidate word 156 (e.g., open) identified from a lexicon by the language model.

Computing device 10 may output a virtual path that traverses a respective location of each respective key of the second group (230). For example, after determining that the second group includes the <O-key>, the <P-key>, the <O-key>, the <I-key>, the <U-key>, the <Y-key>, the <T-key>, the <R-key>, the <E-key>, the <D-key>, the <F-key>, the <G-key>, the <B-key>, and the <N-key>, computing device 10 may cause UID 12 to present virtual path 154 across the respective locations of each of the <O-key>, the <P-key>, the <O-key>, the <I-key>, the <U-key>, the <Y-key>, the <T-key>, the <R-key>, the <E-key>, the <D-key>, the <F-key>, the <G-key>, the <B-key>, and the <N-key>. In some examples, UI module 20 may cause UID 12 to present candidate word 156 within an edit region of user interface 150.

Gesture typing is a popular method of inputting text on touchscreen devices, and, one challenge of gesture typing, especially on a large touch screen (e.g., a tablet) is that the input finger needs to travel long distances if the letters of the intended word are far from each other. The friction between the finger and the touchscreen caused by the long distance traveling can make users uncomfortable. This problem becomes even more severe on the QWERTY keyboard layout, on which the common digraphs are usually placed further apart, on two sides of the keyboard. In other words, finger travel distance may be long for gesture typing, and the long distance finger travel may cause the aforementioned friction problem.

Problems:

Gesture typing is a popular method of inputting text on touchscreen devices, and, one challenge of gesture typing, especially on a large touch screen (e.g., a tablet) is that the input finger needs to travel long distances if the letters of the intended word are far from each other. The friction between the finger and the touchscreen caused by the long distance traveling can make users uncomfortable. This problem becomes even more severe on the QWERTY keyboard layout, on which the common digraphs are usually placed further apart, on two sides of the keyboard. In other words, finger travel distance may be long for gesture typing, and the long distance finger travel may cause the aforementioned friction problem.

Some gesture keyboards adopt a one-to-one direct mapping ratio between the physical finger movement and the generated gesture strokes. For example, if the input finger moves from A to L, these gesture keyboards may generate a virtual trace from A to L, exactly following the input finger. To enter the word "all", the finger may have to physically travel from the letter A to L. The one-to-one mapping requires the finger to physically travel a long distance if letters are far from each other. Unlike the regular gesture typing, described herein are ways to "accelerate" gesture typing by, for example, relying on alternative mapping ratios for defining gesture traces from physical finger movements.

In some examples, a one-to-n ratio, where n is greater than one is used by a computing device to map the finger movement and the gesture trace. In other words, if a person's finger moves one unit on a touch screen, in some examples, a computing device may generate a "n" units long gesture trace. Then the example computing devices may utilize gesture typing techniques as those described above, using the generated virtual traces as input to a language model, spatial model, or decoder for recognition of the sequence of keys that were selected, just prior to the finger being lifted off.

In some examples, the described techniques may enable a computing device to reduce finger travel distances. Additionally, the visual feedback (e.g., the displayed gesture trace) provided in some of the described examples provides an added benefit. Additionally, since some users may be familiar with utilizing other types of input devices (e.g., mice) users may quickly and easily be able to familiarize themselves with a computing device that relies on these example techniques.

In some examples, the described techniques may enable a computing device to change the mapping ratio according to the speed of input finger. For example, if the finger is moving fast, the example computing device may utilize a larger n value; and if the finger slows down, the computing device may use a smaller n value. In this way, the computing device relies on the natural reaction of a user to move his or her finger quickly or fast in order to reach an object far away. Having a larger n value may help the virtual trace quickly reach the intended key. In contrast, if the finger moves slowly, it usually means the user wants to have a fine control of the virtual gesture. A smaller n may be helpful in such a condition. Accordingly, the techniques may be considered to be a kind of dynamic mapping ratio techniques that shares some similarities to a physical mouse may control the cursor position on the screen.

Clause 1. A method comprising: outputting, by a computing device and for display, a graphical keyboard comprising a plurality of keys; responsive to receiving an indication of a gesture that traverses a first group of keys of the plurality of keys, determining, by the computing device, a second group of keys of the plurality of keys, wherein at least one of the second group of keys is different from at least one of the first group of keys; and outputting, by the computing device and for display, a virtual path traversing a respective location of each respective key of the second group of keys.

Clause 2. The method of clause 1, further comprising: determining, by the computing device, based on the second group of keys, a character string; and outputting, by the computing device and for display, the character string.

Clause 3. The method of any of clause 1-2, further comprising: refraining from determining, by the computing device, based on the first group of keys, a character string.

Clause 4. The method of any of clause 1-3, further comprising: outputting, by the computing device and for display, an actual path of the gesture traversing a respective location of each respective key of the first group of keys.

Clause 5. The method of any of clause 1-4, wherein determining the second group of keys further comprises determining, by the computing device, based on at least one of a spatial model or a language model, the second group of keys.

Clause 6. The method of any of clause 1-5 wherein determining the second group of keys further comprises: determining, by the computing device, based on the gesture, a first set of locations of the graphical keyboard; and determining, by the computing device, based on the first set of locations, a second set of locations, the second set of locations being different from the first set of locations by a factor, wherein the second group of keys is determined based on the second set of locations.

Clause 7. The method of clause 6, further comprising: determining, by the computing device, based at least in part on one or more characteristics of the gesture, the factor.

Clause 8. The method of clause 7, wherein the one or more characteristics of the gesture comprise at least one of: a speed of the gesture; a location of the gesture; a direction of the gesture; or a shape of the gesture.

Clause 9. The method of any of clause 7-8, wherein determining the factor comprises: setting, by the computing device, based at least in part on the one or more characteristics of the gesture at an initial time, the factor to an initial value; and setting, by the computing device, based at least in part on the one or more characteristics of the gesture at a subsequent time, the factor to a subsequent value.

Clause 10. The method of any of clause 1-9, wherein at least one of: a shape of the virtual path has a same quantity of inflection points as a shape of the gesture; or the shape of the virtual path has a same degree of curvature as the shape of the gesture.

Clause 11. The method of any of clause 1-10, wherein a length of the virtual path is larger than a length of the gesture.

Clause 12. A computing device comprising: at least one processor; and at least one module operable by the at least one processor to: output, for display, a graphical keyboard comprising a plurality of keys; responsive to receiving an indication of a gesture that traverses a first group of keys of the plurality of keys, determine, a second group of keys of the plurality of keys, wherein at least one of the second group of keys is different from at least one of the first group of keys; determine, based on the second group of keys, a character string; and output, for display, the character string.

Clause 13. The computing device of clause 12, wherein the at least one module is further operable by the at least one processor to determine the second group of keys by at least: determining one or more distances between portions of the gesture; and determining, based on the one or more distances, the second group of keys.

Clause 14. The computing device of clause 13, wherein the at least one module is further operable by the at least one processor to: multiplying, by the computing device, by a factor, the one or more distances, wherein the second group of keys is further determined based on the one or more distances after the one or more distances are multiplied by the factor.

Clause 15. The computing device of clause 14, wherein the at least one module is further operable by the at least one processor to: determining, by the computing device, the factor based on a speed of the gesture.

Clause 16. The computing device of any of clause 14-15, wherein the at least one module is further operable by the at least one processor to: responsive to determining that the speed satisfies a threshold, increasing, by the computing device, the factor; and responsive to determining that the speed does not satisfy the threshold, decreasing, by the computing device, the factor.

Clause 17. The computing device of any of clause 14-16, further comprising a screen, wherein the at least one module is further operable by the at least one processor to: output the graphical keyboard for display at the screen; and determine, based on a size of the screen, the factor.

Clause 18. A computer-readable storage medium encoded with instructions that, when executed, cause at least one processor of a computing device to: output, for display, a graphical keyboard comprising a plurality of keys; responsive to receiving an indication of a gesture that traverses a first group of keys of the plurality of keys, determine a second group of keys of the plurality of keys, wherein at least one of the second group of keys is different from at least one of the first group of keys; and output, for display, a virtual path traversing a respective location of each respective key of the second group of keys.

Clause 19. The computer-readable storage medium of clause 18, wherein the virtual path is output at a region of a display device at which the gesture keyboard is displayed.

Clause 20. The computer-readable storage medium of any of clause 18-19, wherein an initial key of the first and second groups is a same key.

Clause 21. A computing device comprising means for performing any of the methods of clauses 1-11.

Clause 24. A computer-readable storage medium encoded with instructions for causing one or more programmable processors to perform any of the methods recited by clauses 1-11.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   outputting, by a computing device and for display, a graphical keyboard comprising a plurality of keys;
   responsive to receiving an indication of a gesture that traverses a first group of keys of the plurality of keys, determining, by the computing device, a second group of keys of the plurality of keys by at least:
   determining one or more distances between portions of the gesture;
   multiplying, by the computing device, by a factor, the one or more distances; and
   determining, based on the one or more distances after the one or more distances are multiplied by the factor, the second group of keys,
   wherein at least one key of the second group of keys is different from at least one key of the first group of keys, the first and second group of keys is each a different ordered sequence of keys, and an initial key of the first and second groups of keys is always a same key; and
   outputting, by the computing device and for display, a virtual path traversing a respective location of each respective key of the second group of keys.

2. The method of claim 1, further comprising:
   determining, by the computing device, based on the second group of keys, a character string; and
   outputting, by the computing device and for display, the character string.

3. The method of claim 1, further comprising:
   outputting, by the computing device and for display, an actual path of the gesture, wherein the actual path of the gesture traverses respective locations of each respective key of the first group of keys.

4. The method of claim 1, wherein determining the second group of keys further comprises determining, by the computing device, based on at least one of a spatial model or a language model, the second group of keys.

5. The method of claim 1, wherein determining the second group of keys further comprises:
   determining, by the computing device, based on the gesture, a first set of locations of the graphical keyboard; and
   determining, by the computing device, based on the first set of locations, a second set of locations, the second set of locations being different from the first set of locations by an amount determined based on the factor, wherein the second group of keys is determined based on the second set of locations.

6. The method of claim 5, further comprising:
   determining, by the computing device, based at least in part on one or more characteristics of the gesture, the factor.

7. The method of claim 6, wherein the one or more characteristics of the gesture comprise at least one of:
   a speed of the gesture;
   a location of the gesture;
   a direction of the gesture; or
   a shape of the gesture.

8. The method of claim 6, wherein determining the factor comprises:
   setting, by the computing device, based at least in part on the one or more characteristics of the gesture at an initial time, the factor to an initial value; and
   setting, by the computing device, based at least in part on the one or more characteristics of the gesture at a subsequent time, the factor to a subsequent value.

9. The method of claim 1, wherein at least one of:
   a shape of the virtual path has a same quantity of inflection points as a shape of the gesture; or
   the shape of the virtual path has a same degree of curvature as the shape of the gesture.

10. The method of claim 1, wherein a length of the virtual path is larger than a length of the gesture.

11. A computing device comprising:
    a presence-sensitive display;
    at least one processor; and
    at least one module operable by the at least one processor to:
    output, for display at the presence-sensitive display, a graphical keyboard comprising a plurality of keys;
    responsive to receiving an indication of a gesture that traverses a first group of keys of the plurality of keys, determine, a second group of keys of the plurality of keys by at least:
    determining one or more distances between portions of the gesture;
    multiplying, by the computing device, by a factor, the one or more distances; and
    determining, based on the one or more distances after the one or more distances are multiplied by the factor, the second group of keys wherein at least one of the second group of keys is different from at least one of the first group of keys, the first and second group of keys is each a different ordered sequence of keys, and an initial key of the first and second groups of keys is always a same key;

output, for display at the presence-sensitive display, a virtual path traversing a respective location of each respective key of the second group of keys.

12. The computing device of claim 11, wherein the at least one module is further operable by the at least one processor to:
determine the factor based on a speed of the gesture.

13. The computing device of claim 12, wherein the at least one module is further operable by the at least one processor to:
responsive to determining that the speed satisfies a threshold, increase the factor; and
responsive to determining that the speed does not satisfy the threshold, decrease the factor.

14. The computing device of claim 11 wherein the at least one module is further operable by the at least one processor to:
output the graphical keyboard for display at the screen; and
determine, based on a size of the presence-sensitive display, the factor.

15. A non-transitory computer-readable storage medium encoded with instructions that, when executed, cause at least one processor of a computing device to:
output, for display, a graphical keyboard comprising a plurality of keys;
responsive to receiving an indication of a gesture that traverses a first group of keys of the plurality of keys, determine a second group of keys of the plurality of keys by at least:
determining one or more distances between portions of the gesture;
multiplying, by the computing device, by a factor, the one or more distances; and
determining, based on the one or more distances after the one or more distances are multiplied by the factor, the second group of keys wherein at least one of the second group of keys is different from at least one of the first group of keys, the first and second group of keys is each a different ordered sequence of keys, and an initial key of the first and second groups of keys is always a same key; and
output, for display, a virtual path traversing a respective location of each respective key of the second group of keys.

16. The non-transitory computer-readable storage medium of claim 15, wherein the virtual path is output at a region of a display device at which the gesture keyboard is displayed.

* * * * *